United States Patent [19]
Matsumoto

[11] Patent Number: 6,075,324
[45] Date of Patent: Jun. 13, 2000

[54] SMALL PORTABLE APPARATUS WITH EL DEVICE PRODUCING REDUCED NOISE

[75] Inventor: Kouichi Matsumoto, Saitama, Japan

[73] Assignee: NEC Corporation, Tokyo, Japan

[21] Appl. No.: 09/330,197

[22] Filed: Jun. 11, 1999

[30] Foreign Application Priority Data

Jun. 24, 1998 [JP] Japan ................................. 10-177455

[51] Int. Cl.[7] ................................................. H04R 25/00
[52] U.S. Cl. ................... 315/169.3; 315/156; 381/151
[58] Field of Search ............................. 315/169.1, 169.2, 315/169.3, 169.4, 156, 158; 381/151, 192

[56] References Cited

U.S. PATENT DOCUMENTS

| | | | |
|---|---|---|---|
| 5,649,020 | 7/1997 | McClurg et al. | 381/151 |
| 6,005,350 | 12/1999 | Hachiya et al. | 315/169.3 |

FOREIGN PATENT DOCUMENTS

| | | |
|---|---|---|
| 0 793 247 A2 | 9/1997 | European Pat. Off. . |
| 0 898 266 A2 | 2/1999 | European Pat. Off. . |
| 63-307691 | 12/1988 | Japan . |
| 3-37995 | 2/1991 | Japan . |
| 5-234676 | 9/1993 | Japan . |
| 6-308910 | 11/1994 | Japan . |
| 9-245969 | 9/1997 | Japan . |
| 9-266068 | 10/1997 | Japan . |

Primary Examiner—Don Wong
Assistant Examiner—Wilson Lee
Attorney, Agent, or Firm—McGinn & Gibb, P.C.

[57] ABSTRACT

The invention provides a portable apparatus which eliminates noise generated by vibrations of an EL device without adhering a vibration preventing sheet to the apparatus. Microprocessor 3 of the portable apparatus displays characters and a graphic form on display unit 1, and in order to illuminate display unit 1, microprocessor 3 controls EL device driver 5 to generate an AC voltage and causes EL device 4 to emit light. EL device 4 vibrates itself with a frequency equal to the frequency of a driving voltage and generates noise. An output voltage signal having a voltage and a phase converted by reverse phase generator 6 is applied to receiver 7. Consequently, sound of a phase reverse to that of the generated noise is generated from receiver 7. The sound of the phase reverse to that of the noise generated from EL device 4 is combined in a space in front of the receiver with the noise generated from EL device, thereby cancelling the noise generated from EL device 4.

10 Claims, 4 Drawing Sheets

SMALL PORTABLE APPARATUS WITH EL DEVICE PRODUCING REDUCED NOISE

BACKGROUND OF THE INVENTION

1. Field of the Invention

This invention relates to a small portable apparatus, and more particularly to an apparatus which eliminates noise generated when an EL device is used for illumination.

2. Description of the Related Art

In an apparatus which uses an EL device (Electro Luminescent Device), when the EL device emits light, sound (noise) is generated by structural vibrations of the EL device. This is widely known in the art. EL devices which eliminate such noise generation are disclosed in Japanese Patent Laid-Open No. 234676/1993, Japanese Patent Laid-Open No. 308910/1994 and so forth. The apparatus disclosed in the documents are characterized in that an EL device is used as a display device and a plurality of such EL devices are provided in layers. Signal voltages opposite in phase to each other are applied simultaneously to the EL devices to drive the EL devices to display and reduce vibration noise generated from the EL devices.

The EL display apparatus of Japanese Patent Laid-Open No. 234676/1993 includes an EL device wherein a pair of electrodes are formed on the opposite surfaces of an EL light emitting layer, and an AC voltage is applied between the electrodes to cause the EL light emitting layer to emit light. In the EL display apparatus, a plurality of EL devices are disposed such that the EL light emitting layers extend in parallel to each other, and between the electrodes of one of the EL devices, an AC voltage having a phase different from the phase of another AC voltage applied to at least one of the other EL devices is applied individually.

In the EL display apparatus having the construction just described, the plurality of EL elements emit light when AC voltages are applied between the electrodes provided on the opposite surfaces of the EL light emitting layers thereof. When the AC voltages are applied, the EL light emitting layers emit light and simultaneously vibrate themselves. However, the AC voltage applied between the electrodes of one of the EL devices is different in phase from the AC voltage applied to at least one of the other EL devices. Therefore, also the phases of the vibrations generated by the two EL devices are different from each other. Further, since the EL light emitting layers of the two EL devices are disposed in parallel to each other, vibrations generated by the two EL devices interfere with each other. As a result, vibrations of the entire EL display apparatus are reduced, and noise can be prevented well.

Particularly where the phases of the AC voltages applied to the EL devices are divided into two kinds, if two AC voltages having phases opposite to each other are used as the AC voltages to be applied to the EL devices, then noise can be prevented better because the vibrations originating from the two AC voltages always cancel each other.

The EL device of Japanese Patent Laid-Open No. 308910/94 includes two EL light emitting layers each having a pair of electrodes provided on the opposite surfaces thereof. The EL device is characterized in that AC voltages opposite in phase to each other are applied between the paired electrodes of the EL devices formed in two layers to cause the EL light emitting layers to emit light. Noise components by vibrations originating from the two AC voltages cancel each other because the two AC voltages are opposite in phase to each other, and noise is prevented much better.

However, the EL devices disclosed in Japanese Patent Laid-Open No. 234676/1993 and Japanese Patent Laid-Open No. 308910/1994 which eliminate noise generation have a problem in that, since EL devices each of which includes a pair of electrodes and an EL light emitting layer are layered, not only the thickness increases, but also the power consumption increases.

Further, an EL device is often used for illumination of a liquid crystal display unit for a personal computer or an audio apparatus. However, since the level of noise is low, the noise does not bother the user of the EL device in a situation of use in which various sounds are generated therearound such as at home or in an office. However, where an EL device is used with a small portable apparatus such as a portable telephone set and emits light at a place very close to an ear of the user such as at the distance of 1 cm or 2 cm, noise from the EL device comes over to the ear.

Such noise generated from an EL device cannot be avoided from the structure of the EL device, and from restriction to the dimensions of the outer profile and the power consumption, a vibration preventing sheet for absorbing vibrations is usually adhered to the rear surface of the EL device or a like countermeasure is taken to reduce the noise.

Where a vibration preventing sheet is used to reduce noise of an EL device, if the thickness of the noise preventing sheet is small, then the noise reduction effect is low, but if the thickness of the noise preventing sheet is increased, then the size and the weight of the apparatus are increased although the apparatus is a small portable apparatus. The increase in volume and weight has a very great influence with a portable apparatus of several tens grams. Further, although the noise preventing sheet can reduce noise, it cannot eliminate the noise, and besides, an increase in cost is invited by adhesion of the vibration preventing sheet.

SUMMARY OF THE INVENTION

It is an object of the present invention to provide a portable apparatus which eliminates noise by vibrations of an EL device without adhering a vibration preventing sheet.

According to the present invention, a small portable apparatus which uses an EL device for illumination of a display unit and generates an audio signal comprises means for cancelling noise generated by vibrations of the EL device when the EL device emits light with sound of a phase reverse to that of the noise.

Referring to FIG. 1, microprocessor 3 controls display unit driver 2 to display characters and a graphic form on display unit 1. In order to illuminate display unit 1, microprocessor 3 controls EL device driver 5 to generate an AC voltage, which is supplied to EL device 4 to cause EL device 4 to emit light.

If a driving voltage signal is applied to EL device 4, then EL device 4 vibrates with a frequency equal to the frequency of the driving voltage signal and produces an acoustic signal which becomes noise.

The driving voltage signal outputted from driver 5 is converted into a voltage suitable to vibrate receiver 7 and having a reversed phase by reverse phase generator 6.

The output voltage signal having the voltage and the phase converted by reverse phase generator 6 is applied to receiver 7. Consequently, sound of a phase reverse to that of the noise generated from EL device 4 is generated from receiver 7. The sound of the phase reverse to that of the noise generated from EL device 4 is combined in a space in front of the receiver with the noise generated from EL device 4, thereby cancelling the noise generated from EL device 4.

In the present invention, an acoustic signal of a reverse phase is sent out from a receiver which the portable apparatus originally has to cancel the noise generated from the EL device in the space in front of the receiver.

Consequently, the noise generated from the EL device is cancelled in a space in front of an ear of the user who brings its ear close to the receiver so that the user may listen to sound of the receiver.

The first effect of the present invention is to cancel noise generated by vibrations of the EL device. The effect is described with reference to FIG. 2.

EL device 12 vibrates with a frequency equal to the frequency of a driving voltage applied to cause EL device 12 to emit light, and thereby generates noise. The frequency of an EL device driving voltage usually is 1 KHz to 500 Hz and remains in an audio-frequency range of human beings. Further, the luminance of the EL device increases in proportion to the driving voltage and the frequency, and also the magnitude of the audio signal varies depending upon the driving voltage and the frequency as well as the thickness, area and so forth of the EL device. However, when the luminance of approximately 20 cd/m$^2$ is obtained, sound of approximately 40 dBA at the distance of several cm is generated.

Although this is very weak sound, since the user of a portable telephone set contacts, when it uses the telephone set, its ear with sound hole 18, the sound generated from EL device 12 is caught by the ear of the user because the ear is very close to EL device 12.

If the ear of the user catches the sound generated from EL device 12, then since sound generated from an EL device usually has a high frequency when compared with the frequency of voice, the user feels the sound as offensive, tinkling, disagreeable noise.

The present invention makes it possible to cancel, in a space in front of a receiver, disagreeable noise generated by vibrations of an EL device by applying a signal of a phase reverse to that of a driving voltage signal, from which vibrations of the EL device are originated, to the receiver so that sound of a phase reverse to that of the noise is sent out from the receiver.

Consequently, the noise generated from EL device 12 which provides a disagreeable feeling as noise to the user is prevented from coming over to the user.

The second effect of the present invention resides in reduction of the cost.

The reason is that, when compared with the alternative apparatus wherein a vibration preventing sheet is adhered to the rear surface of an EL element, the vibration preventing sheet is not required any more, and an operation to adhere the vibration preventing sheet need not be performed any more.

DESCRIPTION OF THE PREFERRED EMBODIMENTS

In the following, embodiments of the present invention are described in detail with reference to the drawings.

Figure 1:
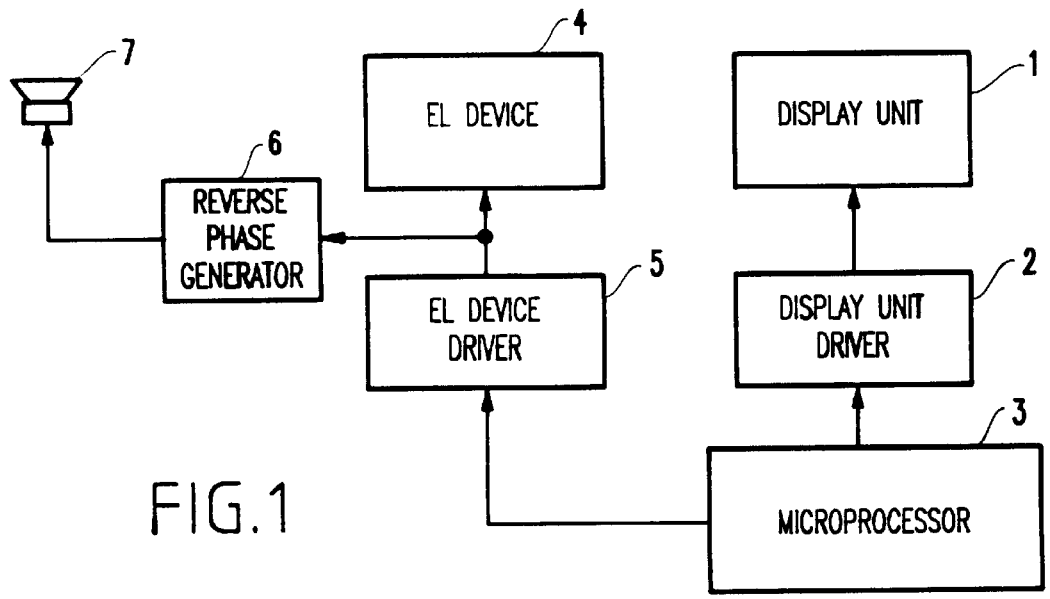
FIG. 1 is a block diagram showing an embodiment of the present invention.

Referring to FIG. 1, microprocessor 3 controls display unit driver 2 to display characters or a graphic form on display unit 1. In order to illuminate display unit 1, microprocessor 3 controls EL device driver 5 so that driver 5 generates and supplies an AC voltage to EL device 4 to cause EL device 4 to emit light. When a driving voltage is applied to EL device 4, EL device 4 vibrates with a frequency equal to the frequency of the driving voltage and thereby generates noise.

The driving voltage signal outputted from driver 5 is converted into a voltage which is suitable to vibrate receiver 7 and has a reversed phase by reverse phase generator 6. The output voltage signal whose voltage and phase have been converted by reverse phase generator 6 is applied to receiver 7. Consequently, sound of a phase opposite to that of the noise generated from EL device 4 is generated from receiver 7. The sound of the opposite phase to that of the noise generated from EL device 4 is combined in a space in front of receiver 7 with the noise generated from EL device 4, thereby cancelling the noise generated from EL device 4.

In the present invention, noise generated from an EL element is cancelled in a space in front of a receiver which a portable apparatus originally has by sending out an acoustic signal of the opposite phase to that of the noise from the receiver. Therefore, noise generated from the EL device is cancelled in a space in front of an ear of the user who brings its ear close to the receiver so that the user may listen to sound of the receiver.

Figure 2:
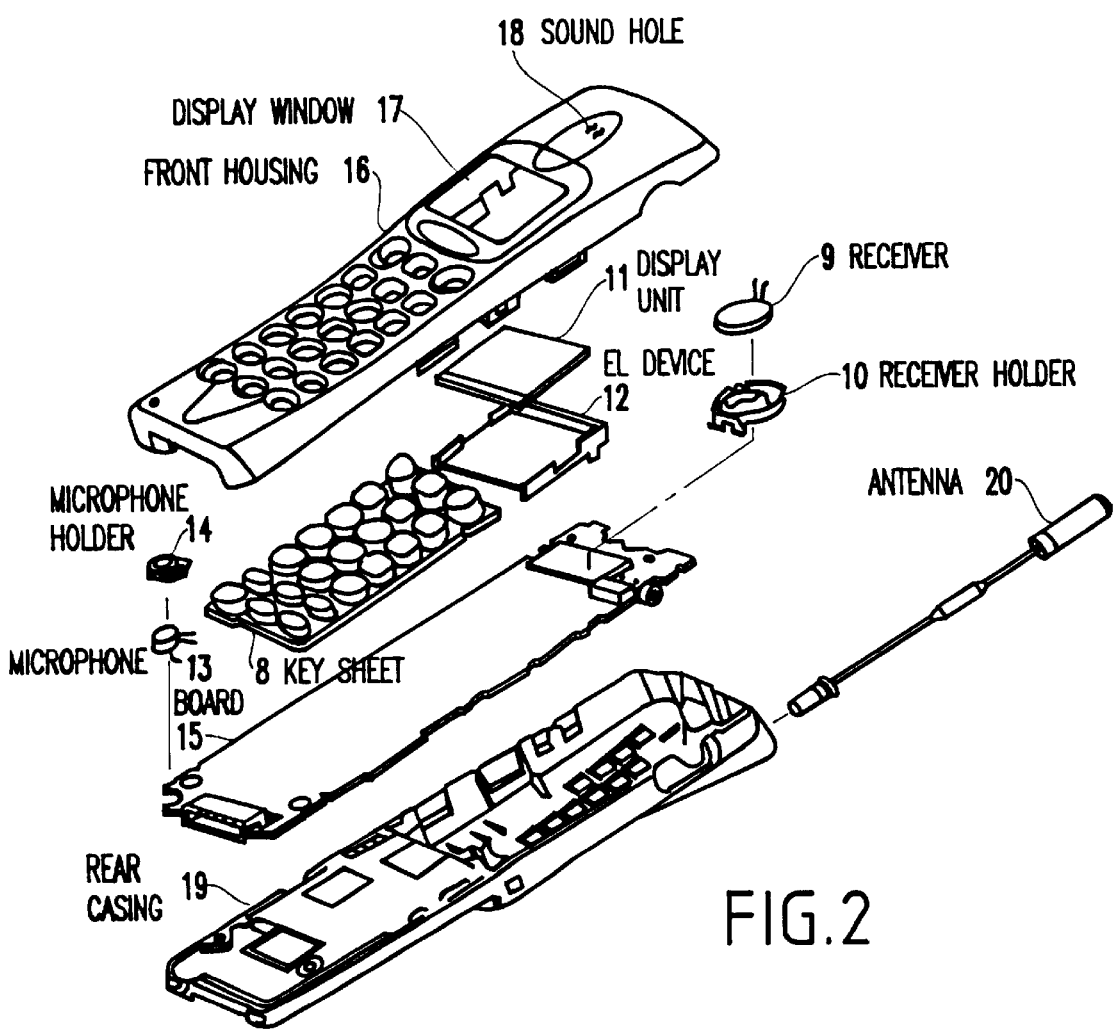
FIG. 2 is an exploded view showing a structure of the embodiment of the present invention wherein an EL device is incorporated for illumination of a display unit of a portable telephone set.

Next, a structure of an embodiment of the present invention wherein an EL device is incorporated for illumination of a display unit of a portable telephone set is described with reference to FIG. 2.

EL device 12 is assembled to the back of display unit 11 and mounted on board 15. Receiver 9 is assembled to receiver holder 10 and mounted on board 15. Microphone 13 is assembled to microphone holder 14 and mounted on board 15. Board 15 on which display unit 11, EL device 12, receiver 9, microphone 13 and microphone holder 14 are mounted and key sheet 8 are assembled in such a manner that they are held between front housing 16 and rear casing 19 to which antenna 20 is attached.

Key sheet 8 is usually formed of a resin or some other suitable material and has a conductive resin applied to surfaces of buttons of keys thereof adjacent board 15. If a button of key sheet 8 is depressed, then the conductive resin applied to the button interconnects two contacts formed on board 15, and from this, the depression of the key is detected.

Antenna 20 is a radio communication antenna for communicating with a radio base station managed by a central office to connect the portable telephone set to a telephone network so that the portable telephone set may communicate as a telephone set.

Display unit 11 is a display unit of the light transmission type in which liquid crystal is used, and EL device 12 is used for illumination from the back of display unit 11.

When display unit 11 is viewed through display window 17, EL device 12 behind display unit 11 emits light so that display unit 11 is illuminated with light which passes through display unit 11.

Microphone 13 converts transmission voice of the user into an electric signal in order to send it by radio communication to the central office.

Receiver 9 for hearing received voice sends out received voice through sound hole 18 perforated in front housing 16. In an assembled state, sound hole 18 and EL device 12 are spaced by a very small distance of approximately 1 cm in rectilinear distance and are very close to each other.

Figure 3:
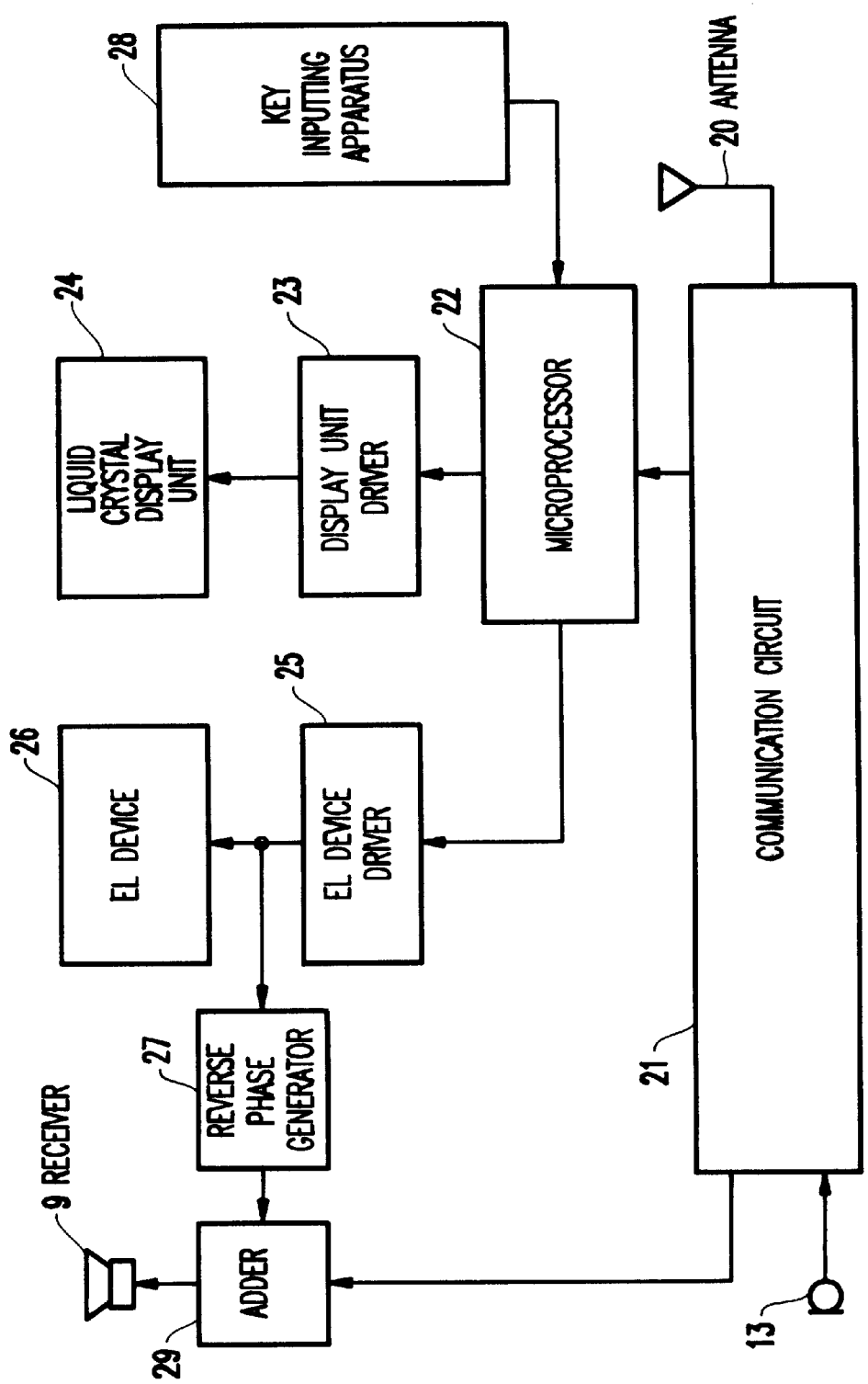
FIG. 3 is a block diagram showing a construction of the portable telephone set of FIG. 2.

Next, a circuit construction of the portable telephone set is described with reference to FIG. 3.

Communication circuit 21 is a transmitter/receiver which allows the portable telephone set to perform radio communicate as a portable telephone by using microphone 13, receiver 9 and antenna 20.

Microprocessor 22 performs control for communication by communication circuit 21. Microprocessor 22 further performs reporting of a telephone number and so forth inputted from key inputting apparatus 28 to communication circuit 21, forwarding to display unit driver 23 of display data to be used for display of a telephone number and a reception field level on liquid crystal display unit 24 and control of EL device driver 25 for causing EL device 26 to emit light for illumination of liquid crystal display unit 24.

Display unit driver 23 is a driver for driving liquid crystal display unit 24 to display and drives liquid crystal display unit 24 based on display data received from microprocessor 22 to display the display data.

In order to illuminate liquid crystal display unit 24, microprocessor 22 controls EL device driver 25 so that EL device driver 25 generates an AC voltage necessary to cause EL device 26 to emit light. Since a portable telephone set usually operates with a DC power supply such as a battery, EL device driver 25 generates, under the control of microprocessor 22, an AC voltage necessary to cause EL device 26 to emit light from a DC voltage obtained from a power supply (not shown) of the portable telephone set.

The AC voltage generated by EL device driver 25 is sent to EL device 26 and causes EL device 26 to emit light.

Reverse phase generator 27 generates a reverse phase AC voltage having a phase reverse to that of the AC voltage from EL device driver 25. Simultaneously, reverse phase generator 27 controls the amplitude of the reverse phase AC voltage to be outputted so that, with the reverse phase AC voltage generated by EL device 26, sound of a reverse phase to that of noise generated by receiver 9 may be generated with an amplitude necessary to cancel the noise.

Figure 4:
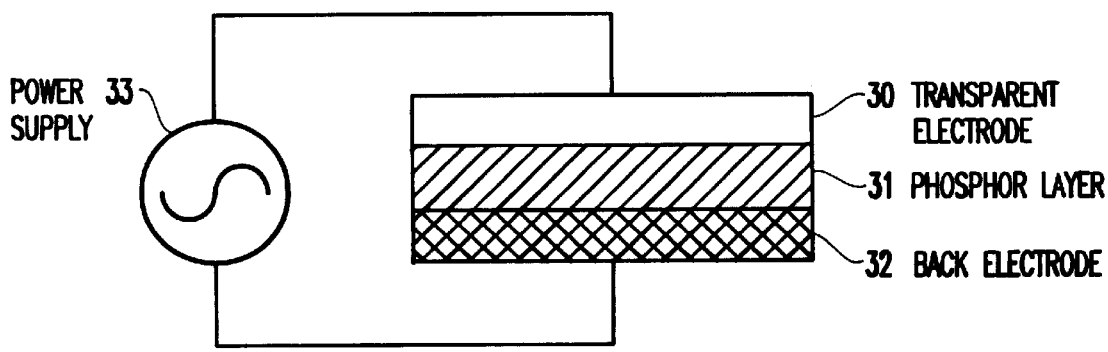
FIG. 4 is a block diagram showing a driver where an EL device is used for illumination.

Next, emission of light of the EL device and noise generated from the EL device are described with reference to FIG. 4 which shows a structure of the EL device.

The EL device is so structured that phosphor layer 31 is held between transparent electrode 30 and back electrode 32, and driving AC power supply 33 is connected to the EL device to cause the EL device to emit light.

While usually the power supply voltage of a portable apparatus is several volts, in order to cause an EL device to emit light, a high AC voltage of approximately 40 to 100 V when compared with the power supply voltage of the apparatus is required, and therefore, driving AC power supply 33 generates and outputs an AC voltage boosted from a DC voltage of several V.

The driving voltage outputted from driving AC power supply 33 is applied to phosphor layer 31 through transparent electrode 30 and back electrode 32. Phosphor layer 31 is usually composed of, for example, a blue green light emitting phosphor such as zinc sulfide (ZnS) bound by a polymer or a like material.

If a driving voltage is applied to phosphor layer 31, then a high electric field is generated in phosphor layer 31, and electrons of the phosphor (not shown) in phosphor layer 31 are accelerated by the high electric field to generate high energy electrons. This state is called excitation, and the excited high energy electrons become free electrons free from orbits around atomic nuclei. The state in which an electron which an atomic nucleus originally has is lost and becomes a free electron is called hole or electron hole.

When a free electron having come out of an orbit couples back to a hole and restores its ground (stable) state, it emits energy as light. The light emitted upon coupling is emitted to the outside of the EL device through transparent electrode 30.

Since the excited state is obtained each time the direction of the electric field varies, when an AC voltage is applied to the EL device, the EL device emits light twice in one cycle of the AC voltage.

Atomic nuclei in crystal are arranged in a regular pattern called crystal lattice. However, if an excited electron is emitted as a free electron, then a displacement occurs with the atomic nucleus. The displacement of the atomic nucleus produces distortion in the crystal lattice, which in turn produces mechanical distortion in the crystal.

When the excited state and the stable state are repeated alternately by application of an electric field, distortion occurs in the crystal lattice by application of the electric field, and when the electric field is removed, the distortion of the crystal lattice is lost and the crystal lattice restores its original state. Consequently, a mechanical vibration is produced. Such mechanical vibrations of the crystal directly become vibrations of the EL device. Noise is produced by the mechanical vibrations of the EL device.

Figure 5:
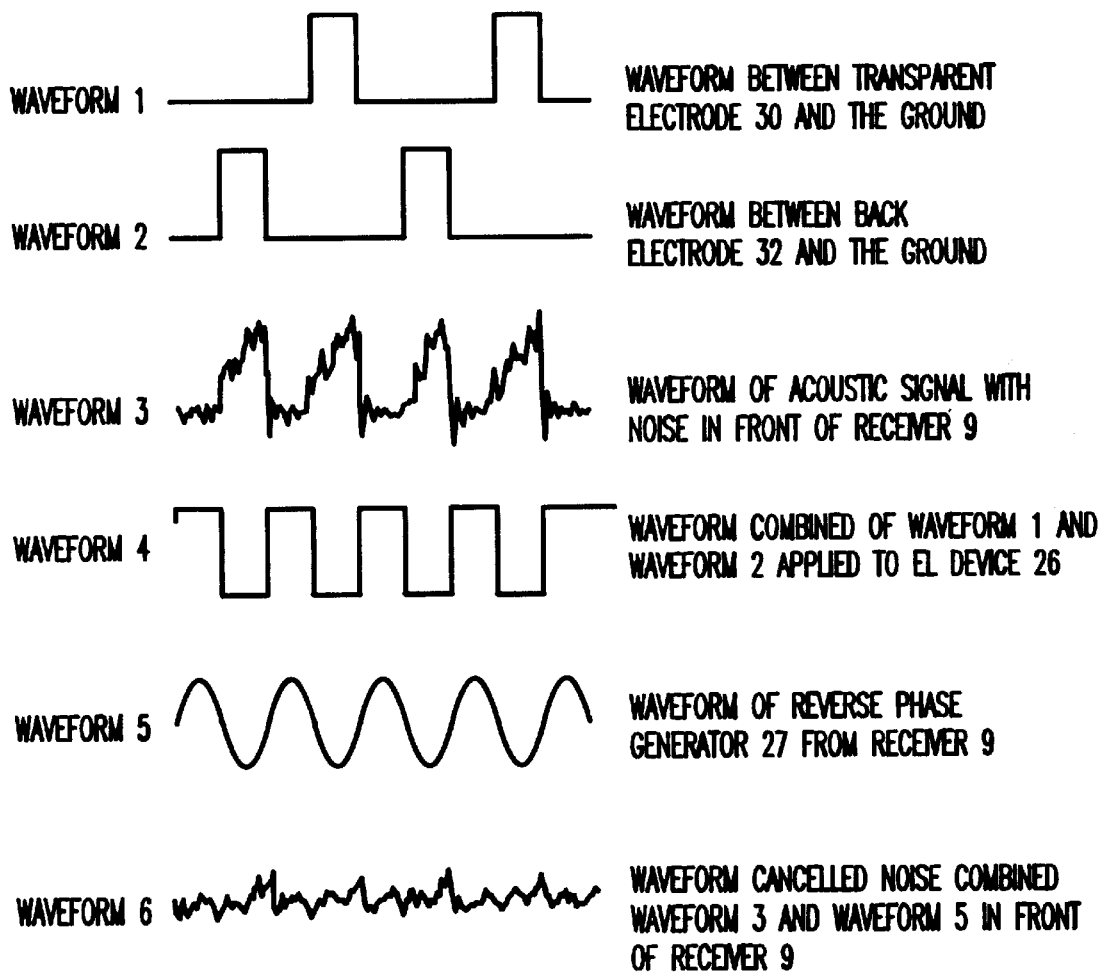
FIG. 5 is a diagram showing voltages or acoustic waves at several locations of the driver of FIG. 4.

In the following, operation is described with reference to FIGS. 3 to 5.

When a telephone number and dial information are inputted from key inputting apparatus 28, microprocessor 22 controls communication circuit 21 to originate a call and establishes a communication condition when the other party responds to the originated call.

Further, when the telephone number is inputted from key inputting apparatus 28, microprocessor 22 sends display data to display unit driver 23, and display unit driver 23 displays the telephone number on liquid crystal display unit 24.

Furthermore, when an input from key inputting apparatus 28 is received, microprocessor 22 controls EL device driver 25 so that EL device driver 25 generates an AC voltage in order to cause EL device 26 to emit light.

The AC voltage generated by EL device driver 25 is sent to EL device 26, and EL device 26 emits light with the AC voltage. In this instance, EL device driver 25 and EL device 26 are connected in such a manner as particularly shown in FIG. 4. Between transparent electrode 30 and the ground in FIG. 4, a voltage of waveform 1 is applied as seen in FIG. 5, and another voltage of waveform 2 is applied between back electrode 32 and the ground.

EL device 26 vibrates itself and generates noise when an AC voltage for causing EL device 26 to emit light is applied thereto. This noise appears as a waveform of an acoustic signal having waveform 3 in front of receiver 9. The AC voltage generated by EL device driver 25 is transmitted also to reverse phase generator 27.

Reverse phase generator 27 generates a reverse phase AC voltage having a phase reverse to the phase of the AC voltage from EL device driver 25. The waveform of the reverse phase AC voltage generated by reverse phase generator 27 appears as a voltage waveform of waveform 4 which is a reversed waveform of a combination of waveform 1 and waveform 2 applied to EL device 26. Simultaneously, reverse phase generator 27 controls the amplitude of the reverse phase AC voltage to be generated so that the reverse phase AC voltage generated may have an amplitude necessary to cause receiver 9 to generate sound of a phase reverse to the phase of the noise generated by EL device 26 to cancel the noise.

The reverse phase AC voltage generated from reverse phase generator 27 is transmitted to receiver 9 through adder 29 so that sound of a phase reverse to the phase of the noise is generated from receiver 9. The sound of the reverse phase outputted from receiver 9 has such an acoustic signal waveform as given by waveform 5.

Receiver 9 is used also to convert a received speech signal from communication circuit 21 into voice and send out the voice. The reverse phase AC voltage generated from reverse phase generator 27 and the received speech signal are added by adder 29 and transmitted to receiver 9, from which they are sent out as sound.

The sound of the reverse phase to that of the noise based on the signal from reverse phase generator 27 and sent out from receiver 9 collides and is combined in a space with the noise generated by the noise generated by EL device 26. Consequently, the noise generated from EL device 26 is cancelled. For example, when no received speech signal is present, a noise waveform of the EL device represented by waveform 3 and waveform 5 of the reverse phase to that of the noise are combined with each other, and consequently, the noise is cancelled as seen from waveform 6.

Next, another embodiment of the present invention wherein an EL device is incorporated for illumination of a display unit of a portable audio recorder is described with reference to FIG. 6.

Figure 6:
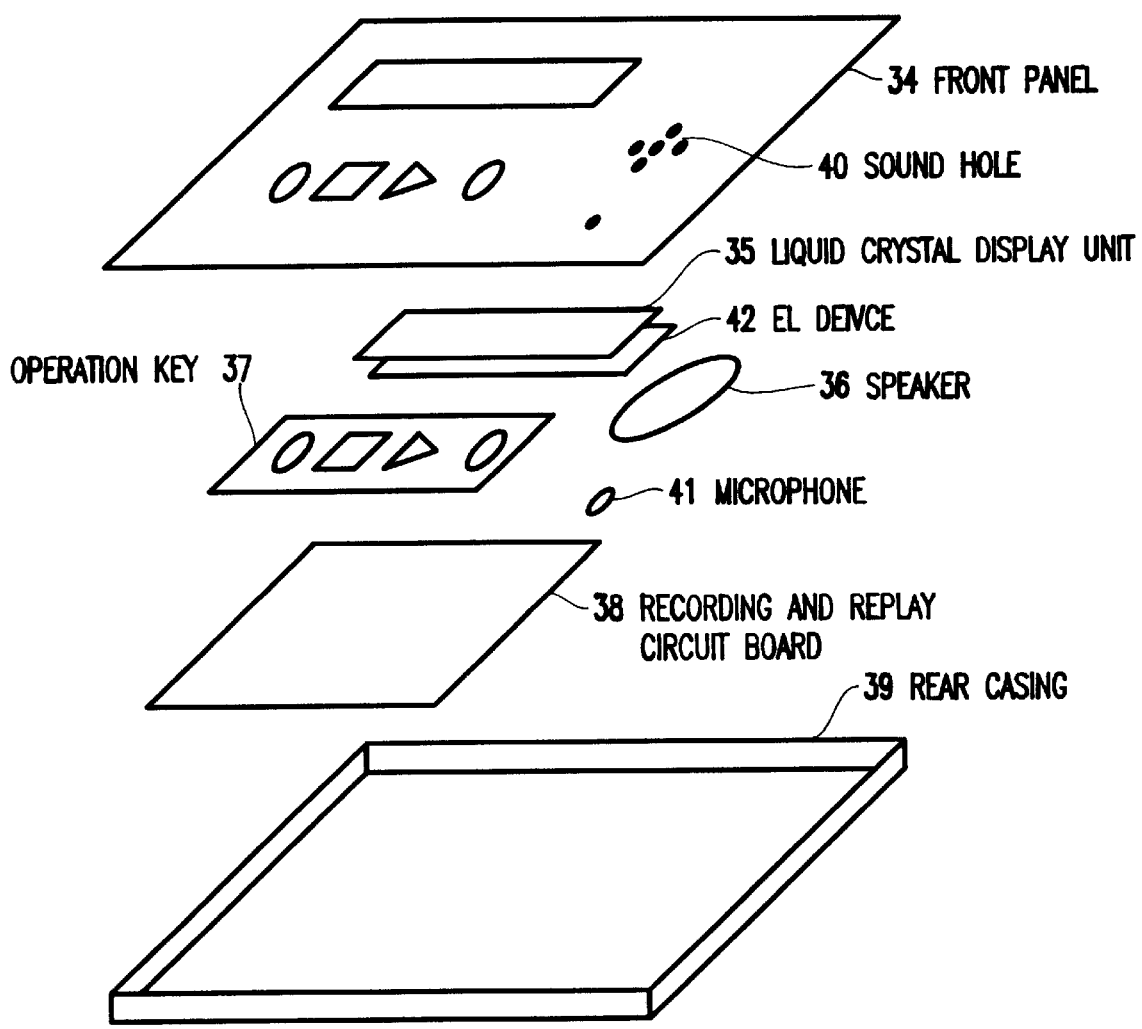
FIG. 6 is a block diagram showing a construction of another embodiment of the present invention.

In FIG. 6, recording and replay circuit 38 is a circuit for performing recording and replay of sound and records sound inputted from microphone 41 in response to an operation of key 37. If an instruction for audio replay by an operation of key 37 is received, then recording and replay circuit 38 reproduces sound and sends out the sound from speaker 36. When such an operation as recording or replay is to be performed, recording and replay circuit 38 displays a condition of the operation, a recording time and other information on liquid crystal display unit 35. Recording and replay circuit 38 causes EL device 42 to emit light for illumination when liquid crystal display unit 35 displays.

An EL device driver (not shown) for causing EL device 42 to emit light and a reverse phase generator (not shown) are built in recording and replay circuit 38. A driving voltage signal outputted from the EL device driver is converted into a voltage suitable to vibrate speaker 36 and having a reverse phase.

The output voltage signal of the voltage and the phase converted by the reverse phase generator is applied to speaker 36.

Consequently, sound of a phase reverse to the phase of noise generated from EL device 42 is generated from speaker 36. The sound of the phase reverse to the phase of the noise generated from EL device 42 is combined in a space in front of the speaker with the noise generated from EL device 42, thereby cancelling the noise generated from EL device 42.

What is claimed is:

1. A small portable apparatus which uses an EL device for illumination of a display unit and generates an audio signal, comprising:
    means for canceling noise generated by vibrations of said EL device when said EL device emits light with sound of a phase reverse to that of the noise.

2. A small portable apparatus according to claim 1, wherein said means for canceling noise is means for outputting an acoustic signal of a phase reverse to that of a driving voltage for said EL element from a receiver included in said small portable apparatus to cancel the noise generated by vibrations of said EL device in a space in front of said receiver.

3. A small portable apparatus according to claim 1, wherein said means for canceling noise includes a reverse phase generator which produces an acoustic signal of a phase reverse to that of the noise generated by vibrations of said EL device when a driving voltage is applied to said EL device.

4. A small portable apparatus according to claim 1, wherein said means for canceling noise includes a receiver included in said small portable apparatus for sending out into a space an acoustic signal of a reverse phase which cancels the noise generated by vibrations of said EL device.

5. A small portable apparatus according to claim 1, wherein said small portable apparatus is a small portable radio telephone set.

6. A small portable apparatus according to claim 1, wherein said small portable apparatus is a portable audio recorder.

7. A small portable apparatus according to claim 1, wherein said small portable apparatus is a portable radio unit.

8. A small portable radio telephone set which uses an EL device for illumination of a display unit, comprising:
    a reverse phase generator for producing an acoustic signal of a phase reverse to that of noise generated by vibrations of said EL device when a driving voltage is applied to said EL device; and
    an adder for adding a received audio output of said ratio telephone set and the acoustic signal.

9. A portable audio recorder which uses an EL device for illumination of a display unit, comprising:
    a reverse phase generator for producing an acoustic signal of a phase reverse to that of noise generated by vibrations of said EL device when a driving voltage is applied to said EL device; and
    an adder for adding a reproduced audio output of said audio recorder and the acoustic signal.

10. A portable radio transmitter-receiver which uses an EL device for illumination of a display unit, comprising:
    a reverse phase generator for producing an acoustic signal of a phase reverse to that of noise generated by vibrations of said EL device when a driving voltage is applied to said EL device; and
    an adder for adding a received audio output of said radio transmitter-receiver and the acoustic signal.

* * * * *